(No Model.)
C. A. HUSSEY.
Magneto Electric Generator.
No. 242,931. Patented June 14, 1881.
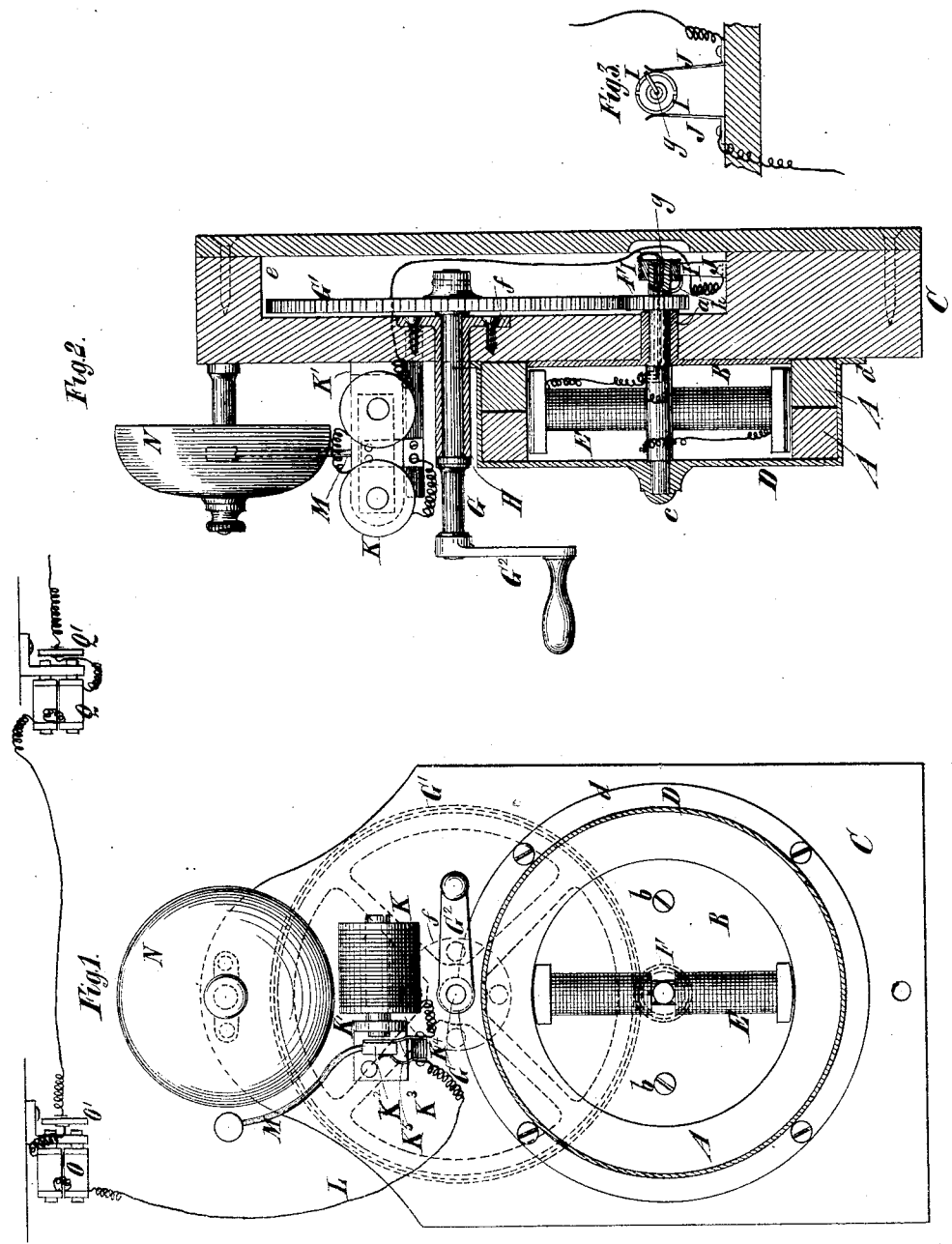
Witnesses
Fred Haynes
Ed Glatzmayer
Inventor
Charles A. Hussey
by his Attorney
Stewart Brown

UNITED STATES PATENT OFFICE.

CHARLES A. HUSSEY, OF NEW YORK, N. Y., ASSIGNOR, BY MESNE AND DIRECT ASSIGNMENTS, TO THE HUSSEY ELECTRIC COMPANY, OF SAME PLACE.

MAGNETO-ELECTRIC GENERATOR.

SPECIFICATION forming part of Letters Patent No. 242,931, dated June 14, 1881.

Application filed January 7, 1881. (No model.)

*To all whom it may concern:*

Be it known that I, CHARLES A. HUSSEY, of the city, county, and State of New York, have invented certain new and useful Improvements in Magneto-Electric Machines, of which the following is a specification.

My improvements consist in the combination, in a magneto-electric machine, of a circular magnet, and a plate of diamagnetic material fitting within the same so as to retain it in its proper position, and provided with a central hub containing a bearing for the shaft, of an armature arranged within the magnet, whereby in a simple manner the central position of the armature within the magnet is secured.

The improvements also consist in the combination, in a magneto-electric machine, of a circular magnet or magnets, a shell of diamagnetic material fitting over the magnet or magnets, and provided with a central hub containing a bearing for an armature arranged within the magnet or magnets, whereby the proper relation of the magnet or magnets and the armature are preserved.

The improvements also consist in the combination, in a magneto-electric machine, of a circular magnet or magnets, a plate of diamagnetic material fitting within the adjacent magnet, and provided with a central hub containing a bearing for an armature-shaft arranged within the magnet or magnets, and a shell of diamagnetic material fitting over the magnet or magnets, and provided with a central hub containing a bearing for the armature-shaft, whereby the magnet or magnets, the plate, the shell, and the armature are in a simple manner securely retained in their proper relations to each other.

In the accompanying drawings, Figure 1 is a front view of a machine embodying my invention. Fig. 2 is a central longitudinal section thereof; and Fig. 3 is an end view of the commutator.

Similar letters of reference designate corresponding parts in all the figures.

A designates permanent magnets, here shown as two in number and of circular form. They consist of steel rings magnetized, according to a process described by me in another application for Letters Patent, so as to have poles or consequent points. Fitting snugly within the rearmost of these magnets is a thin disk or circular plate, B, of brass or other diamagnetic material, provided at the center with a hub, $a$, which fits in an opening in a board, C, forming the base or support of the apparatus. It will be readily understood that the hub $a$ of the plate B, by fitting in the board C, and screws $b$, passing through the plate and entering the said board C, secure the plate in position on said board. The plate, by fitting in the rearmost magnet, retains that in a position concentric with the hub $a$.

D designates a cylindric shell, of brass or other diamagnetic material, which fits snugly over the two magnets A and retains them in position, one exactly in front of the other, and hence the outer one, as well as the rearmost, is concentric with the hub $a$. This shell D is provided with a central hub, $c$, and with a flange, $d$, whereby, through the agency of screws or other means, it may be fastened to the board C.

E designates an armature, wound throughout its length with insulated wire in the same direction. Its shaft is supported in bearings formed one in the hub $a$ and the other in the hub $c$. Therefore, by means of the plate B and the shell D, not only are the magnets A in a very simple manner secured concentrically together, but the armature is also supported concentrically within them.

On the shaft of the armature E, near the rear end, is a pinion, F, fitting in a recess, $e$, in the board C; and on a shaft, G, supported in a bearing, H, attached by a flange, $f$, and screws to the board C, is a large gear-wheel, G', which engages with and imparts motion to the pinion F, and through it to the armature E. The gear-wheel G' is also accommodated in the recess $e$ in the board C. The shaft G is the driving-shaft of the machine, and at the front end is provided with a crank, $G^2$, whereby motion may be imparted to it. Owing to the gear-wheel G' and pinion F, a very rapid motion may be imparted to the armature from a very moderate rotation of the driving-shaft G.

At the rear end of the shaft of the armature E is a commutator consisting, as here shown, of two semi-cylindric shells, I, of brass or other metal, secured to, but insulated by, a bushing of wood, hard rubber, or other suitable material, from the said shaft. One end of the wire wound on the armature is passed rearward through or connected to a pin passing rearward through bushings $g$, of hard rubber or other insulating material, arranged in the said shaft, and is electrically connected to one of the commutator-shells I of the commutator. The shaft of the armature is itself electrically connected by a wire, $h$, to the other shell I of the commutator. Metallic brushes J, bearing on the commutator, conduct the reverse currents generated in the rotation of the armature in the same direction.

K designates an electro-magnet, supported with its arms in a horizontal plane by a bracket, $K'$, secured to the board C. The wire wound on the arms of this electro-magnet is connected to one of the brushes J of the magneto-machine, and the other brush J is connected to a return-wire or a wire leading to the ground.

$K^2$ designates a polarized armature or permanent magnet, supported by a spring, $K^3$, extending from an arm, $K^4$, of hard rubber or other insulating material, which is secured to the board C; and $K^5$ designates another metallic spring, against which the armature $K^2$ is held by its supporting-spring $K^3$ when not otherwise actuated. The wire of the electro-magnet K is connected to the spring $K^3$, whereby the armature $K^2$ is supported, and hence the electric current passes through said spring, thence to the armature, thence to the spring $K^5$, and off by a wire, L, leading from the spring $K^5$. The electric current passing in the way just indicated magnetizes the electro-magnet, and the latter then attracts the armature to it, and thereby separates it from the spring $K^5$, and breaks the electric circuit. As the electro-magnet becomes demagnetized when the circuit is thus broken, the spring $K^3$ carries the armature forward into contact with the spring $K^5$ and completes the electric circuit again. Thereupon the electro-magnet, becoming again magnetized, attracts the armature to it, breaks the electric circuit, and becomes demagnetized, so that the spring $K^3$ carries forward the armature and completes the circuit. In this way the armature is kept rapidly vibrating back and forth, and a bell-clapper, M, mounted upon it, is caused to ring a call-bell, N, which is supported on a pillar secured to the board C. By turning the armature of the magneto-electric machine in different directions currents of electricity may be sent through the electric circuit and through the wire of the electro-magnet in different directions.

It is obvious that when an electric current is passed through the wire of the electro-magnet in such direction that its pole which is opposite the north pole of the polarized armature will be made north, and its pole which is opposite the south pole of the polarized armature will be made south, the armature will not be attracted by the electro-magnet; but when the electric current is passed through the wire of the electro-magnet in the reverse direction the pole of the electro-magnet opposite the north pole of the armature will be made south, and the pole opposite the south pole of the armature will be made north, and thereupon the electro-magnet will attract the armature, and the armature will be vibrated back and forth, as above described.

O and $O'$ designate, respectively, an electro-magnet and a polarized armature; and Q and $Q'$ designate, respectively, another electro-magnet and polarized armature, both of which are connected with the electric circuit L leading from the wire of the electro-magnet K, but which I do not claim herein.

The adjacent electro-magnet K and its call or signal are advantageous, because by means of them the operator of the magneto-electric machine can ascertain whether the electric circuit is all right, and they are useful for signaling to the operator from a distant place.

What I claim as my invention, and desire to secure by Letters Patent, is—

1. In a magneto-electric machine, the combination of a circular magnet and a plate of diamagnetic material fitting within the same, so as to retain it in its proper position, and provided with a central hub containing a bearing for the shaft of an armature arranged within the magnet, substantially as specified.

2. In a magneto-electric machine, the combination of a circular magnet or magnets, a shell of diamagnetic material fitting over the magnet or magnets, and provided with a central hub containing a bearing for an armature arranged within the magnet or magnets, substantially as specified.

3. In a magneto-electric machine, the combination of a circular magnet or magnets, a plate of diamagnetic material fitting within the adjacent magnet, and provided with a central hub containing a bearing for an armature-shaft arranged within the magnet or magnets, and a shell of diamagnetic material fitting over the magnet or magnets, and provided with a central hub containing a bearing for the armature-shaft, whereby the magnet or magnets, the plate, the shell, and the armature are in a simple manner retained in their proper relations to each other, substantially as specified.

C. A. HUSSEY.

Witnesses:
T. J. KEANE,
ED. GLATZMAYER.